US008105028B2

(12) United States Patent
Rugger (10) Patent No.: US 8,105,028 B2
(45) Date of Patent: Jan. 31, 2012

(54) SYSTEMS AND METHODS FOR MITIGATING THE EFFECTS OF WIND TURBINES ON RADAR

(75) Inventor: David A. Rugger, Brookfield, CT (US)

(73) Assignee: Technology Service Corporation, Silver Spring, MD (US)

( * ) Notice: Subject to any disclaimer, the term of this patent is extended or adjusted under 35 U.S.C. 154(b) by 549 days.

(21) Appl. No.: 12/320,733

(22) Filed: Feb. 3, 2009

(65) Prior Publication Data
US 2009/0202347 A1 Aug. 13, 2009

Related U.S. Application Data

(60) Provisional application No. 61/006,979, filed on Feb. 8, 2008.

(51) Int. Cl.
*F04D 27/02* (2006.01)
*F03B 15/06* (2006.01)
*F03D 7/00* (2006.01)
*F03D 11/00* (2006.01)
*F01D 7/00* (2006.01)
*B63H 3/00* (2006.01)
*B63H 1/00* (2006.01)
*B63H 5/00* (2006.01)
*B63H 7/00* (2006.01)
*B64C 11/00* (2006.01)

(52) U.S. Cl. ........... 416/1; 415/2.1; 415/4.1; 415/17; 415/26; 415/905; 415/47; 415/118; 416/35; 416/37; 416/41; 416/43; 416/46; 416/49; 416/61

(58) Field of Classification Search ............. 416/1, 95, 416/96 R, 96 A, 97 R, 97 A; 415/115
See application file for complete search history.

(56) References Cited

U.S. PATENT DOCUMENTS

| 4,117,485 A | 9/1978 | Gorr et al. |
| 7,172,386 B2 * | 2/2007 | Truong et al. ............... 415/4.1 |
| 7,695,242 B2 * | 4/2010 | Fuller ............... 415/2.1 |
| 2004/0057828 A1 | 3/2004 | Bosche |

FOREIGN PATENT DOCUMENTS

WO WO 2007/038992 A1 4/2007

OTHER PUBLICATIONS

Tennant A et al, "Signature management of radar returns from wind turbine generators," Smart Materials and Structures, IOP Publishing Ltd., Bristol, GB, vol. 15, No. 2, Apr. 1, 2006, pp. 468-472, XP020105371, ISSN: 0964-1726, pp. 468-470.

(Continued)

*Primary Examiner* — David Zarneke
(74) *Attorney, Agent, or Firm* — Finnegan, Henderson, Farabow, Garrett & Dunner, LLP (57) ABSTRACT

A control system for mitigating the effects of a wind turbine on a radar system is disclosed. The control system includes a sensor configured to detect an operating condition of the radar system; a processor configured to receive an operating condition of the wind turbine and determine a rotation modification sequence based on the operating condition of the radar system and the operating condition of the wind turbine; and a controller configured to apply the rotation modification sequence to the wind turbine. A method of mitigating the effects of a wind turbine on a radar system is also disclosed.

20 Claims, 4 Drawing Sheets

OTHER PUBLICATIONS

PCT Search Report and Written Opinion in counterpart PCT application PCT/US2009/032950, May 25, 2009.

"Wind Turbines and Radar Operational Experience and Mitigation Measures," Spaven Consulting, http://www.bwea.com/pdf/Wind-Turbines-and-Radar-Operational-Experience-and-Mitigation-Measures.pdf, Dec. 2001.

"Wind Farm Clutter Mitigation in Air Surveillance Radar," Aerospace and Electronic Systems Magazine, IEEE, vol. 22, Issue 7, Jul. 2007, pp. 35-40.

"Stealth Technology for Wind Turbines: Final Report," http://www.bwea.com/pdf/AWG_ Reference/0805%20BERR% 20Stealth% 20 Technology%20for%20Wind%20Turbines.pdf, BAE, Dec. 2007.

* cited by examiner

SYSTEMS AND METHODS FOR MITIGATING THE EFFECTS OF WIND TURBINES ON RADAR

I. RELATED APPLICATION

The present disclosure claims the benefit of priority of U.S. Provisional Patent Application No. 61/006,979 filed Feb. 8, 2008, which is incorporated herein by reference.

II. FIELD OF THE INVENTION

The present disclosure relates to mitigating the effects of wind turbines on radar, and more particularly, to systems and methods for mitigating the effects of wind turbines on radar by modifying wind turbine operation based on radar operation.

III. BACKGROUND OF THE DISCLOSURE

In recent years, the demand for wind energy has increased in relation to the decreasing supplies and increasing prices of fossil fuels. As a result, windmills or "wind turbines" have grown in both size and numbers. In some locations, farms of modern wind turbines have been erected within miles of critical radar systems, such as commercial air traffic control and military defense radar systems. These "wind farms" are having an increasingly detrimental effect on the performance of nearby radar systems.

First of all, each of these modern wind turbines often has a relatively large radar cross-section (RCS) due to its large mast and blades. For example, many modern wind turbines are being constructed with three 25-75 meter blades rotatably mounted on a mast that is 80-120 meters in height. Some of these wind turbines have been calculated to have an RCS between approximately 40 and 50 $dBm^2$. Such an RCS can cause interference that lowers the sensitivity of a radar system. Moreover, taller masts have placed these large turbine blades within reach of faster moving air currents, but have also made them more visible to surrounding radar systems.

Second, the rotational velocity of wind turbine blades has also increased, with blade tips sometimes approaching speeds generally associated with that of aircraft (e.g., approximately 200 m/s). Therefore, each rotating blade of a wind turbine may cause Doppler reflections perceived by a radar system to resemble a moving target of interest. In many instances, quickly rotating wind turbine blades have been responsible for radar systems generating false target reports.

In the fields of civilian and military aircraft radar, various techniques are used to distinguish between genuine aircraft targets and nonessential radar clutter. For example, in radar systems located on the ground, moving target detection (MTD) filters are used to remove reflected radar targets having velocities below a predetermined threshold value. Such filters are generally effective in preventing low-speed and stationary objects from appearing on radar screens. However, certain moving objects, such as modern wind turbines, are especially difficult to distinguish from aircraft radar signatures, using only traditional radar processing and filter techniques. Specifically, because each wind turbine has a nominal effective velocity at its rotor, each blade rotating about the rotor exhibits a large range of detectable velocities between naught (near the rotor) and velocities increasing radially outwardly from the rotor to a maximum velocity at the tip of the blade. The corresponding range of Doppler reflection frequencies caused by the blade may render MTD filters ineffective.

Accordingly, various alternative approaches have been used to mitigate the rotational effects of wind turbines on aircraft radar systems. For example, attempts have been made at reducing mast height or relocating wind turbines away from radar systems, generally to the detriment of turbine power output. Most other techniques involve modifying wind turbine geometry or materials, adjusting the radar line-of-sight, or implementing complex radar processing methods. Unfortunately, these methods are often costly, difficult to implement, and ineffective. Moreover, many existing radar systems are not capable of being readily updated with wind turbine mitigation processing. As a result, some radar systems simply block out, or "mask" areas located over known wind turbine farms. This technique compromises radar accuracy and prevents aircraft from being tracked over wind farms.

Accordingly, there is a need for improved techniques for mitigating the effects of wind turbines on radar systems.

The systems and methods of the present disclosure solve one or more of the problems set forth above.

IV. SUMMARY OF THE DISCLOSURE

In accordance with one disclosed exemplary embodiment, a control system for mitigating the effects of a wind turbine on a radar system is disclosed. The control system includes a sensor configured to detect an operating condition of the radar system; a processor configured to receive an operating condition of the wind turbine and determine a rotation modification sequence based on the operating condition of the radar system and the operating condition of the wind turbine; and a controller configured to apply the rotation modification sequence to the wind turbine.

In another exemplary embodiment, a method of mitigating the effects of a wind turbine on a radar system is disclosed. The method includes the steps of detecting an operating condition of the radar system with a sensor; receiving an operating condition of the wind turbine; and modifying the operation of the wind turbine based on the operating condition of the radar system and the operating condition of the wind turbine.

In yet another exemplary embodiment, a method of mitigating the effects of a wind turbine on a radar system is disclosed. The method includes the steps of determining an operating condition of the radar system with a sensor; determining a current operating condition of the wind turbine; calculating a new operating condition of the wind turbine based on the operating condition of the radar system and the current operating condition of the wind turbine; and modifying the operation of the wind turbine based on a comparison between the current operating condition of the wind turbine and the new operating condition of the wind turbine.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

VI. DETAILED DESCRIPTION OF THE DRAWINGS

Reference will now be made in detail to the present embodiments of the disclosure, certain examples of which are illustrated in the accompanying drawings.

Figure 1:
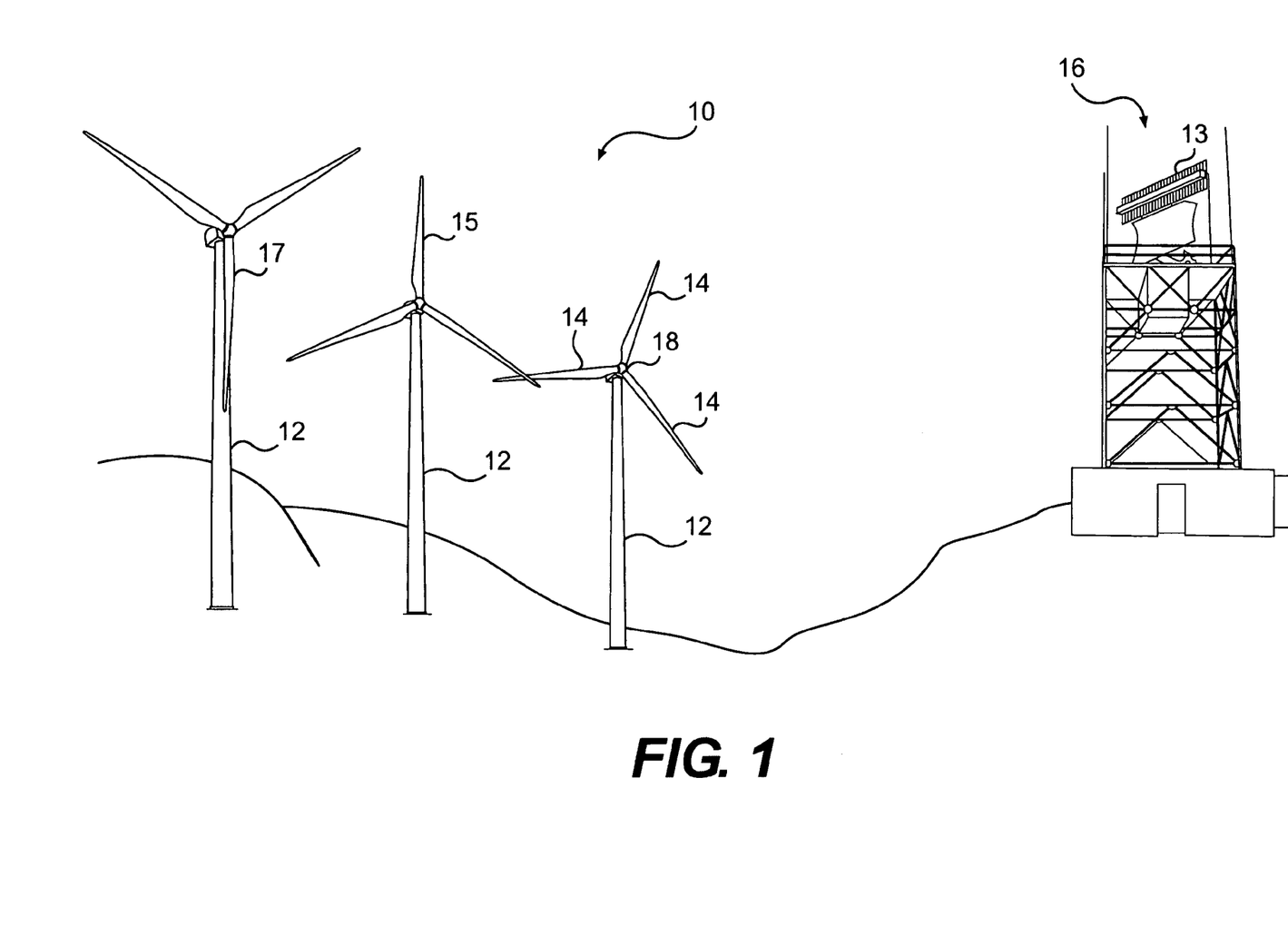
FIG. 1 illustrates a pictorial representation of an exemplary wind turbine farm and radar system.

FIG. 1 depicts part of an exemplary wind turbine farm 10 and an exemplary radar system 16. Wind turbine farm 10 may include a plurality of wind turbines 12 configured to convert kinetic wind energy into useful electric power. Each wind turbine 12 may include a plurality of blades 14 configured to rotate in a vertical plane about a horizontal axle, or rotor 18. In one exemplary embodiment of the disclosure, wind turbine 12 may be capable of rotation about a vertical axis, allowing blades 14 to rotate in any rotational plane, as dictated by current wind conditions or by a controller. Likewise, wind turbine 12 may have blade rotation rate that varies based on current wind conditions or remains steady at a controlled blade rotation rate of anywhere between typically 5 and 20 RPM.

In one exemplary embodiment, each wind turbine 12 may include three blades 14, each of the three blades disposed 120 degrees apart from another in the rotational plane of the wind turbine. In this embodiment, a wind turbine 12 having three blades 14 would experience a blade rotating into a particular orientation approximately every 0.5 to 2.0 seconds. Of course, it will be appreciated that the present disclosure is applicable to any type of horizontal axis wind turbine, having any number of blades.

Radar system 16 may be any type of radar system that can be negatively impacted by the rotational motion of a wind turbine located within its range. For purposes of example, radar system 16 may be any commercial or military radar system used for air traffic control, air surveillance, or geographical mapping. In one embodiment, radar system 16 may include a radar transmitting/receiving antenna 13, which rotates at approximately 12 to 15 RPM, with a radar beam width of approximately 1 degree. Such a radar beam would encounter a given point in its range every 4 to 5 seconds, with a radar signal lasting approximately 15 milliseconds. Accordingly, in one exemplary embodiment, a radar signal generated by radar system 16 may point toward each wind turbine 12 within its range for approximately 15 milliseconds every 4 to 5 seconds. It is during these relatively short periods of time that the blade orientation of a wind turbine 12 may negatively impact the operation of radar system 16.

Figures 2A, 2B:
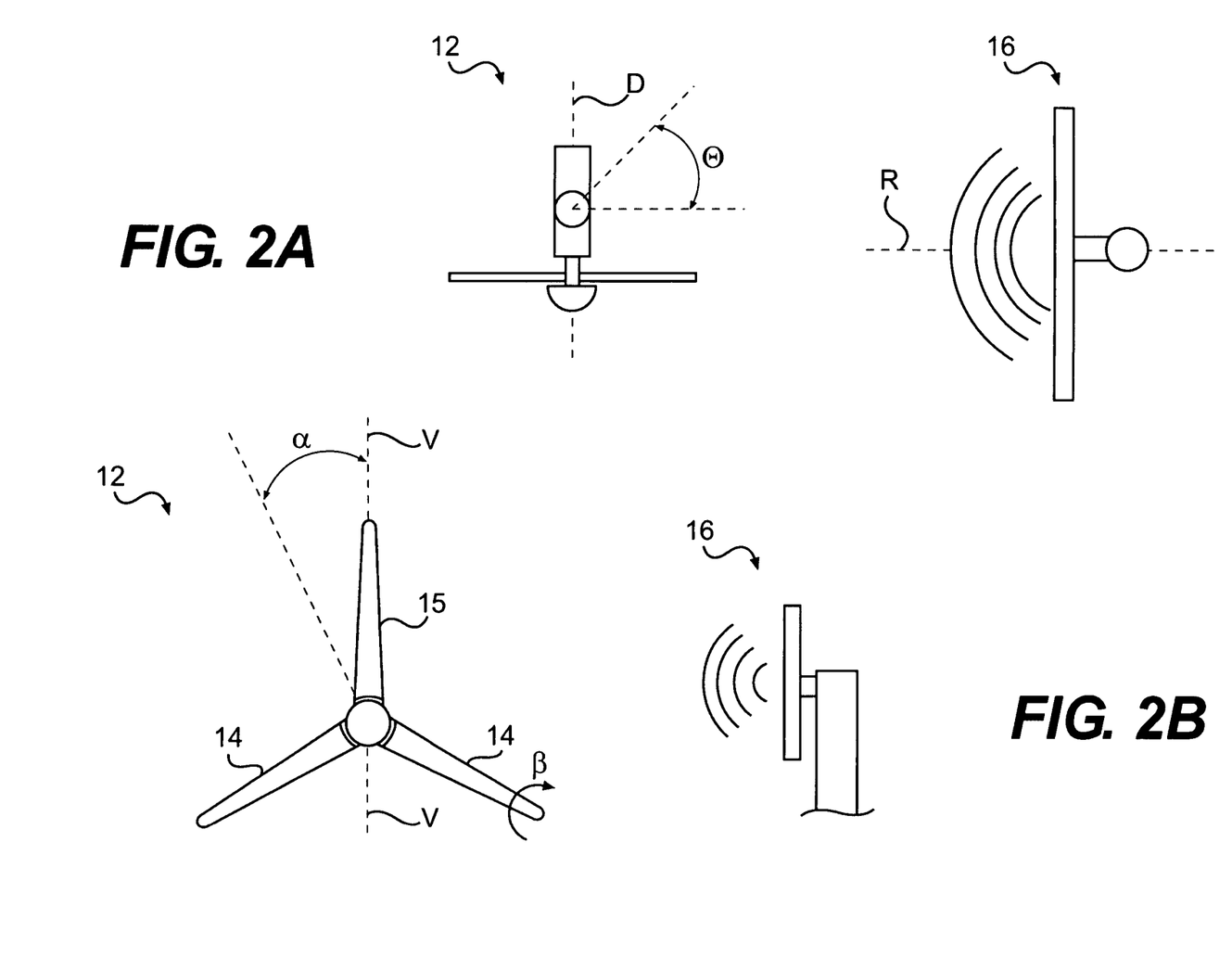
FIG. 2A illustrates a top view of an exemplary wind turbine and radar system.
FIG. 2B illustrates a side view of an exemplary wind turbine and radar system.

FIG. 2A illustrates a top view of an exemplary wind turbine 12 and radar system 16. Wind turbine 12 is depicted as having a rotor axis D, about which the blades of wind turbine 12 rotate. Radar system 16 is depicted as having a radar axis R, which indicates the direction of its rotating or otherwise scanning radar signal. In general, when rotor axis D and radar axis R are normal to each other, as depicted in FIG. 2A, the wind turbine 12 may be perceived by radar system 16 as creating particularly high-bandwidth Doppler reflections. Conversely, when the rotor axis D and radar axis R are parallel to one another, the blade of wind turbine 12 may exhibit only DC Doppler frequencies, and thus no false targets. When rotor axis D and radar axis R are neither parallel nor normal, there may still be a significant Doppler bandwidth reflected by wind turbine 12 and perceived by radar system 16. This may reduce the ability of radar system 16 to detect aircraft. Therefore, when rotor axis D and radar axis R are in any orientation other than parallel to each other, there may be at least some amount of blade motion in the directions toward and away from radar system 16 that will cause intermittent reflections that cannot be eliminated with typical radar processing.

When rotor axis D and radar axis R are not parallel to each other, especially detrimental reflections may occur when the surface of a blade is normal to the radial line between wind turbine 12 and radar system 16. When wind turbine 12 and radar system 16 are at the same altitude, this condition typically occurs when a blade is oriented normal to the surface of the earth. However, if wind turbine 12 and radar system 16 are at different altitudes, this condition may occur during blade orientations not strictly normal to the surface of the Earth. For example, it may occur along any axis located in the rotational plane of the blades and perpendicular to the radial line between wind turbine 12 and radar system 16. In addition, if a blade of wind turbine 12 is curved, there may be a range of blade orientations during which a portion of the blade surface is undesirably normal to the radial line between wind turbine 12 and radar system 16.

FIG. 2B illustrates an exemplary wind turbine 12, having relatively straight blades 14, and a radar system 16 located at a similar altitude (the distance between them is not drawn to scale). In this example, when a blade 14 is oriented along vertical axis V (i.e., normal to the radial line to the radar), as blade 15 is depicted in FIG. 2B, wind turbine 12 may cause significant and undesirable Doppler reflections to be perceived by radar system 16. Thus, as each blade 14 of wind turbine 12 rotates in the rotational plane defined by angle α, it will come into position with vertical axis V twice per complete rotation. In the case of an exemplary three-blade wind turbine 12, this undesirable condition may occur six times per complete rotation.

Similarly, FIG. 1 depicts a wind turbine 12 having a blade 15 pointing directly upward (i.e., normal to the surface of the Earth), as well as a wind turbine 12 having a blade 17 pointing directly downward (also normal to the surface of the Earth). Each of these two depicted blade conditions may be especially detrimental to the operation of a nearby radar system 16 at a similar altitude, if it occurs during a radar scan (i.e., when the radar signal is pointed toward the wind turbine) when rotor axis D and radar axis R are not parallel.

In this example, each time a blade 14 is in one of the two undesirable "vertical" conditions, the tip of the blade may provide the largest horizontal velocity component detected by the radar system. In other words, when a rotating blade is oriented in the 12 o'clock and 6 o'clock positions (as opposed to its 3 and 9 o'clock positions), the tip portion of the blade may be perceived by radar system 16 as traveling over the surface of the Earth at a high rate of speed. More significantly, the radar cross section of the blade in the direction of the radar may increase tremendously at the 12 o'clock and 6 o'clock blade orientations, causing interfering radar flashes. Therefore, the intermittent and bright reflections generated by these orientations may be most frequently responsible for generating false aircraft targets. Accordingly, it may be advantageous to prevent a wind turbine 12 from having any of its blades oriented normal to the radar signal in the approximately 15 milliseconds during which a nearby radar system 16 is pointed in its direction.

In one embodiment of the present disclosure, each wind turbine 12 may be provided with its own control system for preventing its blades 14 from being oriented in any undesirable condition during a radar scan. Alternatively, a plurality of wind turbines 12 of wind turbine farm 10 may be coupled to a common control system for mitigating the rotational effects of the plurality of wind turbines 12 on a nearby radar system 16.

Figure 3:
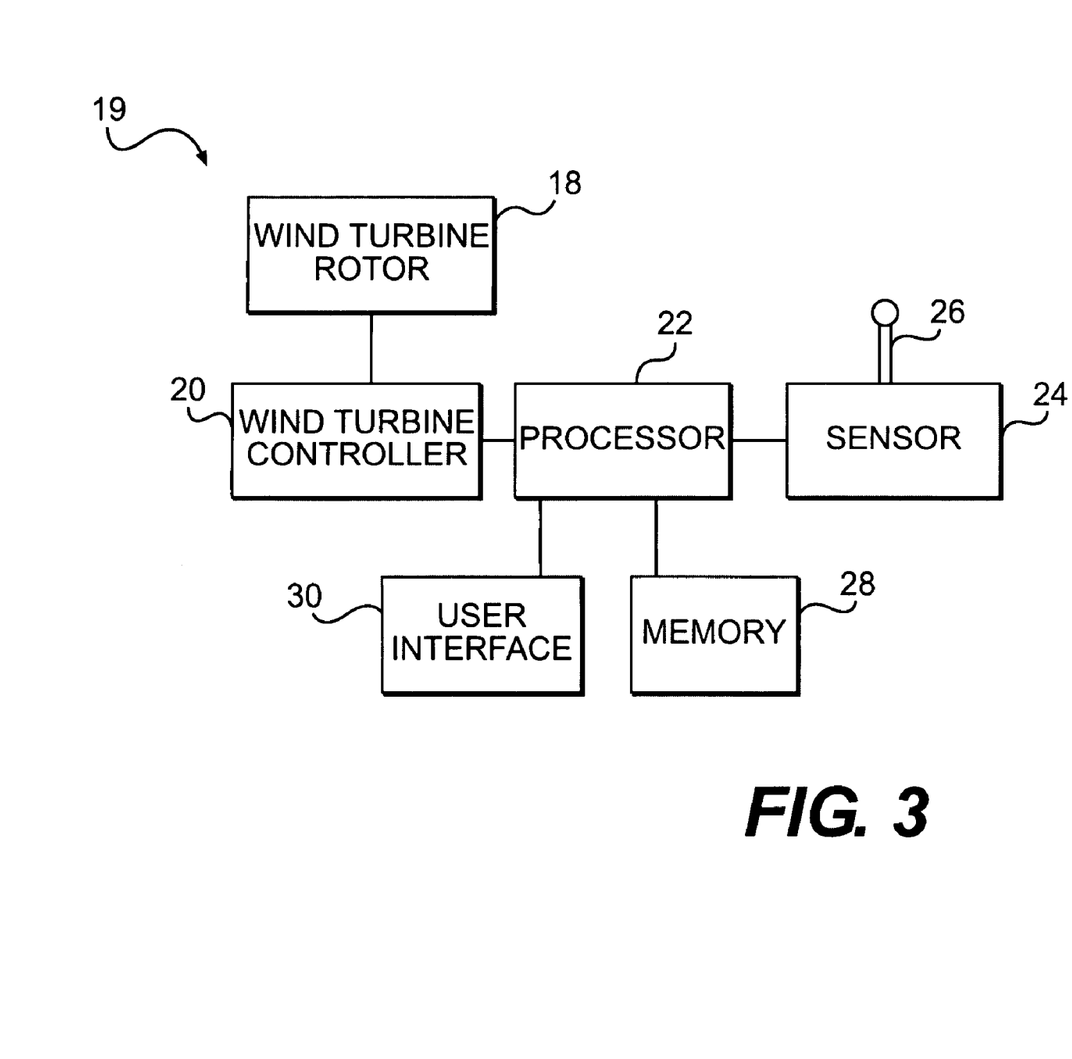
FIG. 3 illustrates an exemplary embodiment of a system for mitigating the rotational effects of a wind turbine on a radar system.

Referring to the embodiment of FIG. 3, a control system 19 may be associated with a wind turbine controller 20 of each wind turbine. In general, wind turbine controller 20 may be any type of existing hardware and/or software configured to control the operation of a wind turbine. As depicted in the embodiment of FIG. 3, wind turbine controller 20 may be configured to manipulate a wind turbine rotor 18, such as by applying a torque to the rotor. For example, wind turbine controller 20 may be a brake, such as a regenerative brake, or an electric motor configured to speed or slow a rotation of wind turbine rotor 18. Thus, wind turbine controller 20 could be any mechanism configured to apply a torque to wind turbine rotor 18.

In another embodiment, wind turbine controller 20 may be configured to rotate the wind turbine mast and/or rotor 18 about a vertical axis through an angle θ shown in FIG. 2A, so as to modify the orientation of the rotational plane of the blades 14, relative to the Earth. Thus, wind turbine controller 20 may be configured to modify the angle at which a nearby radar system 16 perceives Doppler reflections generated by the rotating blades 14. In yet another embodiment, wind turbine controller 20 may be configured to adjust the pitch of blades 14 of wind turbine 12, such as through an angle β as shown in FIG. 2B. Modifying the pitch of blades 14 may alter their angular velocity as affected by the wind. Thus, in each embodiment, wind turbine controller 20 may be configured to directly or indirectly modify the angular position and/or velocity of blades 14 at any given time.

In order to mitigate the rotational effects of a wind turbine 12 on a nearby radar system 16, control system 19 may include a sensor 24 and a processor 22 in communication with the wind turbine controller 20 of each wind turbine 12.

Sensor 24 may be configured to detect an operating condition of radar system 16. Sensor 24 may be installed anywhere near an existing wind turbine 12. Alternatively, sensor 24 may be pre- or post-fabricated into a mast, nacelle, or any other component of its respective wind turbine 12. In one embodiment, sensor 24 may be an RF sensor having an antenna 26 configured to detect electromagnetic waves transmitted by radar system 16. Sensor 24 may also be configured to communicate a signal to processor 22 based on the detected electromagnetic waves. Sensor 24 may include or communicate with an analog-digital converter. In one embodiment, sensor 24 may determine a scan rate and/or beam width of radar system 16. In an alternative embodiment, sensor 24 may merely convey the radar signal data to processor 22 and processor 22 may be configured to calculate the scan rate of radar system 16 based on the radar signal received from sensor 24. Processor 22 may also be configured to calculate the beam width of radar system 16, based on the radar signal received from sensor 24.

Processor 22 may be any suitable type of processor and may be configured to receive turbine operating information from wind turbine controller 20 in addition to the radar signal data from sensor 24. Processor 22 may also be configured to perform calculations based on the turbine operating information and radar signal data. The functions of processor 22 may be provided by a single dedicated processor or by a plurality of processors. Moreover, processor 22 may include, without limitation, digital signal processor (DSP) hardware, or any other hardware capable of executing software.

In addition to sensor 24 and wind turbine controller 20, processor 22 may be in further communication with a memory 28 and a user interface 30.

Memory 28 may be configured to store constant parameters relating to wind turbine 12 and radar system 16. For example, memory 28 may store specifications defining physical attributes of wind turbine 12 and radar system 16, as well as user-defined operating variables. Memory 28 may also be configured to store computing instructions to be accessed by processor 22. Memory 28 may be any type of memory such as: magnetic storage, semiconductor storage, optical disc storage, and/or magneto-optical disc storage.

User interface 30 may allow an operator of a wind turbine or radar system to provide inputs to processor 22 and/or memory 28. For example, an operator may update the operation of processor 22 by storing new processor instructions on memory 28. An operator may also use user interface 30 to input the constant parameters associated with a particular wind turbine and/or radar system. In one embodiment, user interface 30 may be a local or remotely-networked computer.

Figure 4:
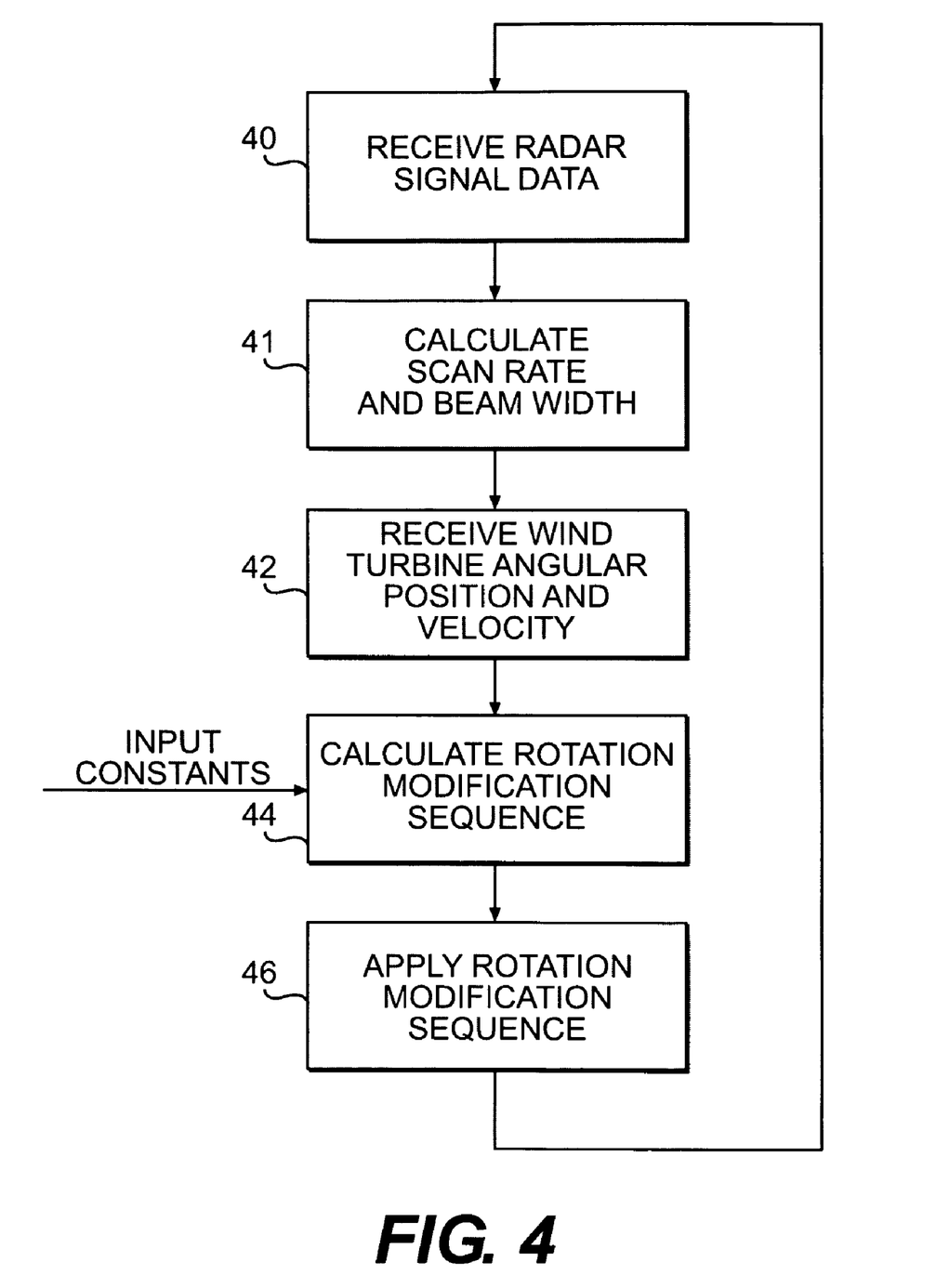
FIG. 4 illustrates an exemplary embodiment of a method for mitigating the rotational effects of a wind turbine on a radar system.

FIG. 4 illustrates an exemplary method for mitigating the rotational effects of a wind turbine on a radar system. The exemplary method may include an initial step of receiving radar signal data of a nearby radar system (step 40). For example, referring back to FIG. 3, sensor 24 may detect radar signal data transmitted by radar system 16. Sensor 24 may then communicate the radar signal data and/or calculated radar scan rate and beam width to processor 22 and/or memory 28. Alternatively, processor 22 may determine the radar scan rate and beam width based on signal data received from sensor 24 (step 41).

The method may further include receiving an angular blade position and velocity of a wind turbine 12 (step 42). For example, wind turbine controller 20 may determine the angular position and velocity of wind turbine blades 14 as a function of time based on various turbine operation sensors coupled to turbine controller 20. In one embodiment, wind turbine controller 20 may be coupled to a turbine operation sensor, such as an optical or magnetic angular position sensor, located on rotor 18 of wind turbine 12. Wind turbine controller 20 may communicate the temporal blade angular position and velocity to processor 22.

The method may further include calculating a rotation modification sequence based on the radar scan rate, radar beam width, turbine blade angular position, and velocity (step 44). The rotation modification sequence may also be calculated based on input constants defining physical attributes of wind turbine 12 and/or radar system 16. For example, the acceleration or deceleration properties of blades 14 may be considered as a function of their known masses. Likewise, the drag forces on blades 14 may be considered as a function of their known aerodynamic geometries, angular velocity, and/or current wind conditions.

The rotation modification sequence may be any series of instructions implemented by wind turbine controller 20 for mitigating the rotational effects of wind turbine 12 on radar system 16. Specifically, the rotation modification sequence may be calculated by processor 22 and implemented by wind turbine controller 20 so as to prevent blades 14 of wind turbine 12 from being undesirably oriented during a radar scan (as described above).

For example, the rotation modification sequence may include braking instructions for wind turbine controller 20 to apply braking torque to wind turbine rotor 18. Alternatively, the rotation modification sequence may include drive instructions for wind turbine controller 20 to apply driving torque to wind turbine rotor 18. In another embodiment, the rotation modification sequence may include instructions for the mast or rotor 18 to rotate around a vertical axis, thereby modifying the orientation of the rotational plane of blades 14. In yet another embodiment, the rotation modification sequence may include instructions for adjusting the pitch of blades 14. The braking torque, driving torque, rotational plane, and/or blade pitch may be selectively controlled to modify angular blade velocity so as to avoid a vertical blade position during a radar scan.

In one embodiment, each rotation modification sequence must only modify blade rotation enough to ensure a non-vertical blade orientation during the next anticipated radar scan. This may be calculated by first estimating the time and duration of the next anticipated radar scan as a function of the most recent radar scan (as detected by sensor 24) and/or a recent history of radar scans. Next, the anticipated blade condition at that next scan time may be calculated as a function of the most recently determined angular position and velocity of the wind turbine blades 14. Because the general order of magnitude of the radar scan rate is the same as the angular velocity of the wind turbine blades 14, the blade rotation may require no more than $\frac{1}{12}$ of an angular position or velocity modification to avoid a radar scan of a vertical blade. In addition, the anticipated blade condition may be determined to be acceptable for the next several scans, but then, for some future scan, to be unacceptable. The blade rotation may be modified so as to increase the number of scans for which the blade condition would be acceptable. This could have the advantage of permitting a smaller modification to the blade rotation compared to modification for only the next scan.

Finally, the method may include applying the determined rotation modification sequence (step 46). For example, in response to the rotation modification sequence calculated by processor 22, wind turbine controller 20 may be instructed to adjust an operation of wind turbine 12 by any method (such as those exemplary methods described above). Thus, the rotation modification sequence may be implemented for periodically speeding up or slowing down blade rotation to prevent blades 14 from being vertically oriented during a radar scan.

As will be appreciated by one of skill in the art, the rotation modification sequence may be calculated at least once during each complete rotation of blades 14. Alternatively, implementation of a rotation modification sequence once during every few rotations may be sufficient to prevent a radar scan of a vertically oriented blade. Further, the calculation of the rotation modification sequence may indicate that no modification is necessary, and thus the wind turbine 12 would not be adjusted.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A control system for mitigating the effects of a wind turbine on a radar system, the control system comprising:
 a sensor configured to detect an operating condition of the radar system;
 a processor configured to receive an operating condition of the wind turbine and determine a rotation modification sequence based on the operating condition of the radar system and the operating condition of the wind turbine; and
 a controller configured to apply the rotation modification sequence to the wind turbine.

2. The control system of claim 1, wherein the sensor comprises an RF antenna mounted proximate to the wind turbine.

3. The control system of claim 1, further comprising:
 a memory configured to store data including: constant parameters of the wind turbine, constant parameters of the radar system, and instructions for determining the rotation modification sequence of the wind turbine.

4. The control system of claim 1, further comprising:
 a user interface configured to receive operating inputs from a user.

5. The control system of claim 1, wherein the controller is configured to apply torque to a rotor of the wind turbine.

6. The control system of claim 1, wherein the controller is configured to increase an angular blade velocity of the wind turbine.

7. The control system of claim 1, wherein the controller is configured to decrease an angular blade velocity of the wind turbine.

8. The control system of claim 1, wherein the controller is configured to modify a directional orientation of the wind turbine.

9. The control system of claim 1, wherein the controller is configured to modify a blade pitch of the wind turbine.

10. A method of mitigating the effects of a wind turbine on a radar system, the method comprising the steps of:
 detecting an operating condition of the radar system with a sensor;
 receiving an operating condition of the wind turbine; and
 modifying the operation of the wind turbine based on the operating condition of the radar system and the operating condition of the wind turbine.

11. The method of claim 10, wherein detecting an operating condition of the radar system includes one of: determining a scan rate of the radar system and detecting a beam width of the radar system.

12. The method of claim 10, wherein receiving an operating condition of the wind turbine includes one of: receiving an angular blade position of the wind turbine and receiving an angular blade velocity of the wind turbine.

13. The method of claim 10, wherein modifying the operation of the wind turbine includes determining a rotation modification sequence for the wind turbine, based on the operating condition of the radar system and the operating condition of the wind turbine.

14. The method of claim 13, wherein determining a rotation modification sequence includes calculating an expected time and duration of an impending radar scan.

15. The method of claim 13, wherein determining a rotation modification sequence includes calculating a time period during which at least one blade of the wind turbine is expected to be undesirably oriented.

16. The method of claim 13, wherein determining a rotation modification sequence includes calculating an acceleration or deceleration value for a blade of the wind turbine based on a blade mass and geometry.

17. The method of claim 10, wherein modifying the operation of the wind turbine includes applying torque to a rotor of the wind turbine.

18. The method of claim 10, wherein modifying the operation of the wind turbine includes modifying a blade pitch of the wind turbine.

19. The method of claim 10, wherein modifying the operation of the wind turbine includes modifying a directional orientation of the wind turbine.

20. A method of mitigating the effects of a wind turbine on a radar system, the method comprising the steps of:
    determining an operating condition of the radar system with a sensor;
    determining a current operating condition of the wind turbine;
    calculating a new operating condition of the wind turbine based on the operating condition of the radar system and the current operating condition of the wind turbine; and
    modifying the operation of the wind turbine based on a comparison between the current operating condition of the wind turbine and the new operating condition of the wind turbine.

* * * * *